July 1, 1930.   R. E. HELLMUND   1,768,953

FREQUENCY CHANGER

Filed April 26, 1923   3 Sheets-Sheet 1

WITNESSES:

INVENTOR
Rudolf E. Hellmund
BY
ATTORNEY

Patented July 1, 1930

1,768,953

UNITED STATES PATENT OFFICE

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA

FREQUENCY CHANGER

Application filed April 26, 1923. Serial No. 634,880.

My invention relates to alternating-current converters and it has as its object to provide a novel dynamo-electric mechanism for the exchange of power between two alternating-current systems of different frequencies.

When electrical power is exchanged between two systems by means of a synchronous motor-generator set, the ratio of the poles of the motor and generator is determined by the frequencies of the two systems, and accordingly certain difficulties are encountered in the design of such machines, particularly, where the frequency ratio is such that machines having a relatively large number of poles must necessarily be employed.

In its general aspect, my invention provides a frequency changer which operates at a definite synchronous speed and which is not as restricted, in the choice of the pole-numbers, by the above-mentioned limitation.

I accomplish the object just stated by providing a driving unit and a generating unit operating on the induction-machine principle and having their rotor members mechanically connected, and their secondary members electrically interconnected.

A further object of my invention is to provide additional exciting means for the excitation of the secondary members of machines of the above-indicated character, and to control the amount of magnetizing current drawn from the line, or make the machines self excited.

A still further object of my invention is to provide means for varying the relative phase and magnitude of the currents flowing in the two secondary members in order to control the amounts of real and reactive power exchanged between the two alternating-current systems. I have found that the object just stated may be realized by means of a single machine of the commutator type, connected to the secondary members of the frequency changer, as will be more fully described hereinafter.

Another object of my invention is to combine a motor unit and a generator unit of the above-indicated character in a single simple and efficient machine having the structure of a standard induction motor with both the stator and the rotor wound with uniformly distributed coils. To this end, I utilize novel windings giving two different pole numbers corresponding to the motor and to the generator, respectively, the machine being capable of operating on both pole-numbers without mutual interference.

With the above and other objects in view, my invention consists in the combinations and novel features of construction which are indicated in the claims appended hereto and which will be understood from the following description taken in connection with the accompanying drawing, wherein Figure 1 is a simple diagrammatic view of circuits and apparatus illustrating one of the principles embodied in my invention.

Figure 1:
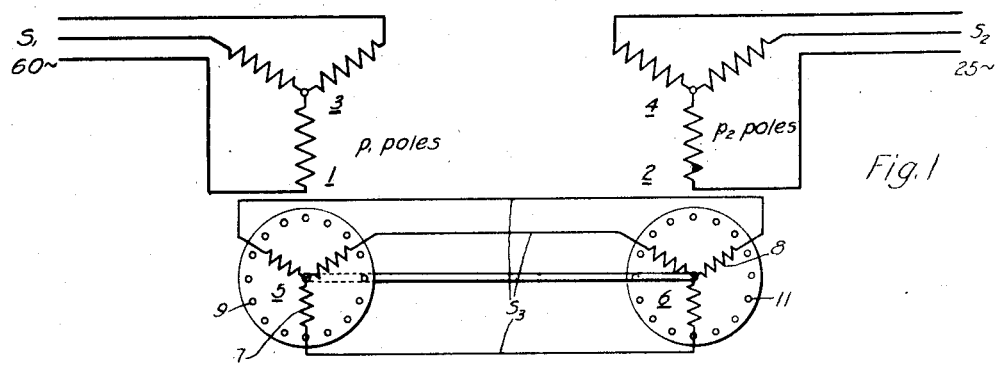

In Fig. 1 are shown two dynamo-electric machines 1 and 2 having their stator windings 3 and 4 connected to two alternating-current systems $S_1$ and $S_2$. Both machines are of induction-motor type and have polyphase wound rotors 5 and 6, respectively, which are coupled mechanically and concatenated electrically.

In the present description, I shall assume, for purposes of illustration, that the system $S_1$ is a 60 cycle system, that the system $S_2$ is a 25-cycle and that the entire frequency-changer combination is designed for supplying energy from the 60-cycle system $S_1$ to the 25-cycle system $S_2$. Under such assumption, the machine 1 may have eight poles corresponding to a synchronous speed of 900 R. P. M. and the machine 2 may have four poles corresponding to a synchronous speed of 750 R. P. M. The frequency changer will then run at a speed of 850 R. P. M.

The speed of the frequency changer is determined by the low-frequency current which circulates through the interconnecting conductors $S_3$ between the secondary windings 7 and 8 on the rotors 5 and 6, respectively. Thus, at the speed of 850 R. P. M., the 60-cycle, 8-pole field of the motor 1 will induce, in the secondary windings 7, an electromotive force having a positive slip frequency of 3.33. The positive slip frequency of the secondary windings 7 is identical with the negative slip frequency induced in the secondary windings 8 of the induction generator 2 with respect to the 25-cycle, 4-pole field, and consequently the machines 1 and 2 are locked, by their common secondary frequency, into a definite synchronous speed, in a way analogous to a direct-current excited synchronous machine.

The general relation between the pole numbers of the machines and the frequencies may be expressed by the following equations, wherein N is the actual running speed of the two machines $f_1$ is the frequency of the supplying system, $f_2$ is the frequency of the supplied system, $f_3$ is the common slip frequency of the secondaries, $p_1$ is the number of pole-pairs of the motor and $p_2$ is the number of pole pairs of the generator. We have $$\frac{N}{60}=\frac{f_1-f_3}{p_1}=\frac{f_2+f_3}{p_2}=\frac{f_1+f_2}{p_1+p_2}$$

$$f_3=\frac{f_1 p_2-f_2 p_1}{p_1+p_2}.$$

The rotors 5 and 6 are shown as being provided also with additional windings 9 and 11 which may be of the squirrel-cage type and which serve to increase the output of the machines.

Figure 2:
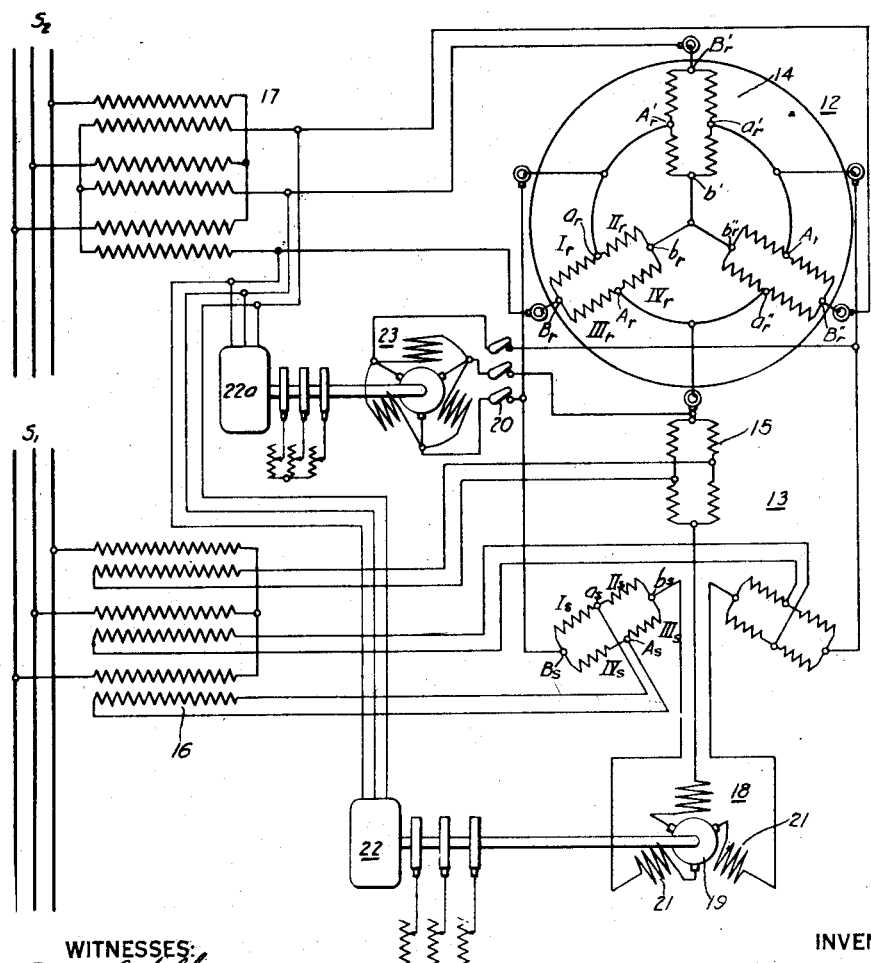
Fig. 2 is a similar view illustrating a unitary frequency changer embodying my invention, said frequency changer being excited by means of two separate exciters.

In Fig. 2 is shown a more elaborate frequency-changer system embodying my invention. It comprises a single machine having a rotor 12 and a stator 13 which may consist of slotted laminated bodies similar to the cores of a standard induction motor. The rotor 12 and the stator 13 are provided with polyphase windings 14 and 15, respectively, each phase of each winding consisting of a plurality of coils adapted to operate simultaneously in conjunction with two different pole-numbers without mutual interference. While windings of the general type hereinabove described are known in the art, a particular winding utilized in a frequency changer connected between a 60-cycle system and a 25-cycle system will be described and claimed hereinafter.

In Fig. 2, each phase winding is shown diagrammatically as consisting of four coils or groups of coils I, II, III, IV. The stator and rotor windings are distinguished by subscripts "s" and "r," respectively, and the terminals corresponding to the two pole numbers are indicated by the letters A, $a$ for $p_1$ poles and B, $b$ for $p_2$ poles. An electrical system $S_1$ having a frequency $f_1$ supplies power to the $p_1$-pole winding-connections $A_s$, $a_s$ of the stator, through a transformer 16. The $p_2$-pole winding-connections $B_r$, $b_r$ of the rotor are connected, through a transformer 17, to an electrical system $S_2$, having a frequency $f_2$. The $p_1$-pole terminals $A_r$, $a_r$, of the rotor are mesh connected, and the points of the mesh are connected in series with the $p_2$-pole winding-connections $B_s$, $b_s$ of the stator, said winding connections being shown as star-connected. The star connections of the stator may be completed by a three-phase exciter 18 shown as being connected into the middle point of the star.

The exciter 18 is shown diagrammatically as a polyphase commutator machine consisting of an armature winding 19, of the commutator type, and a plurality of field windings 21. Variable amounts of power may be exchanged between the exciter machine 18 and one of the polyphase systems, say $S_2$, by means of an auxiliary variable-speed induction motor or induction-generator 22. By proper adjustment of the brush position, or by any other suitable means, the phase and the magnitude of the electromotive force generated or induced in the exciter may be adjusted, as will be obvious to those skilled in the art. The generated voltage may also be varied in magnitude by adjusting the speed of the driving motor 22.

A second exciter unit 23, which may also be of the polyphase commutator type, is shown connected in parallel between the terminals of the two secondary winding connections by means of switches 20.

In operation, the $f_1$-cycle supply line $S_1$ will induce a $p_1$-pole rotating field in the stator 13. This field is ineffective with regard to the $p_2$-pole winding-connections B, $b$ of the stator and the rotor, but it induces a voltage in the $p_1$-pole winding-connections of the rotor, said induced voltage having a positive slip-frequency $f_3$. In a similar way, the $p_2$-pole field induced in the rotor by the system $S_2$ of the frequency $f_2$ is effective only with regard to the $p_2$-pole winding of the stator and induces therein currents having a negative slip-frequency $f_3$. The positive-slip of the pole system $p_1$ produces the necessary torque to drive the unit and to generate energy in the $p_2$ pole system, the amount of energy transferred corresponding to the slip frequency. Under these circumstances, the rotor will run at a fixed or synchronous speed corresponding to the common slip-frequency $f_2$ of the set, as explained in connection with Fig. 1.

The magnetization or excitation current flowing in the secondary winding connections may be either drawn from the lines $S_1$ and $S_2$, as in the case of the usual induction motor and generator, or it may be supplied by separate exciting means. To this end the exciter 18 is provided, by means of which any voltage component may be added in the slip-frequency circuits, and the amount of lagging power drawn from the lines may be reduced and the power factor corrected by means of leading currents drawn by the machines. The relation between the ratio of frequencies and the power interchanged between the two systems $S_1$ and $S_2$ may also be controlled by means of the induction machine 22.

We may, however, connect a second exciter 23 across the low-frequency secondary circuit conductors between the stator and the rotor, in order to produce a phase difference between the currents in the low frequency circuits of the stator and the rotor. The results obtained by the last-described arrangement will best be understood by comparing it to a direct-current excited synchronous frequency-changer arrangement. In the latter arrangement, if the two independent polyphase systems are free to assume any desired phase relation, the phases of the voltages at the generator and motor sides are determined by the geometrical position of the direct-current excited poles of the generator with respect to the poles of the motor. In general, these poles will be permanently fixed with respect to each other. With the arrangement as used in my invention, the relative position of the poles in the motor and the generator may be easily regulated by adjusting the phase relation of the currents in low frequency circuits, and the amounts of real and reactive power transferred between the two systems controlled.

Figure 3:
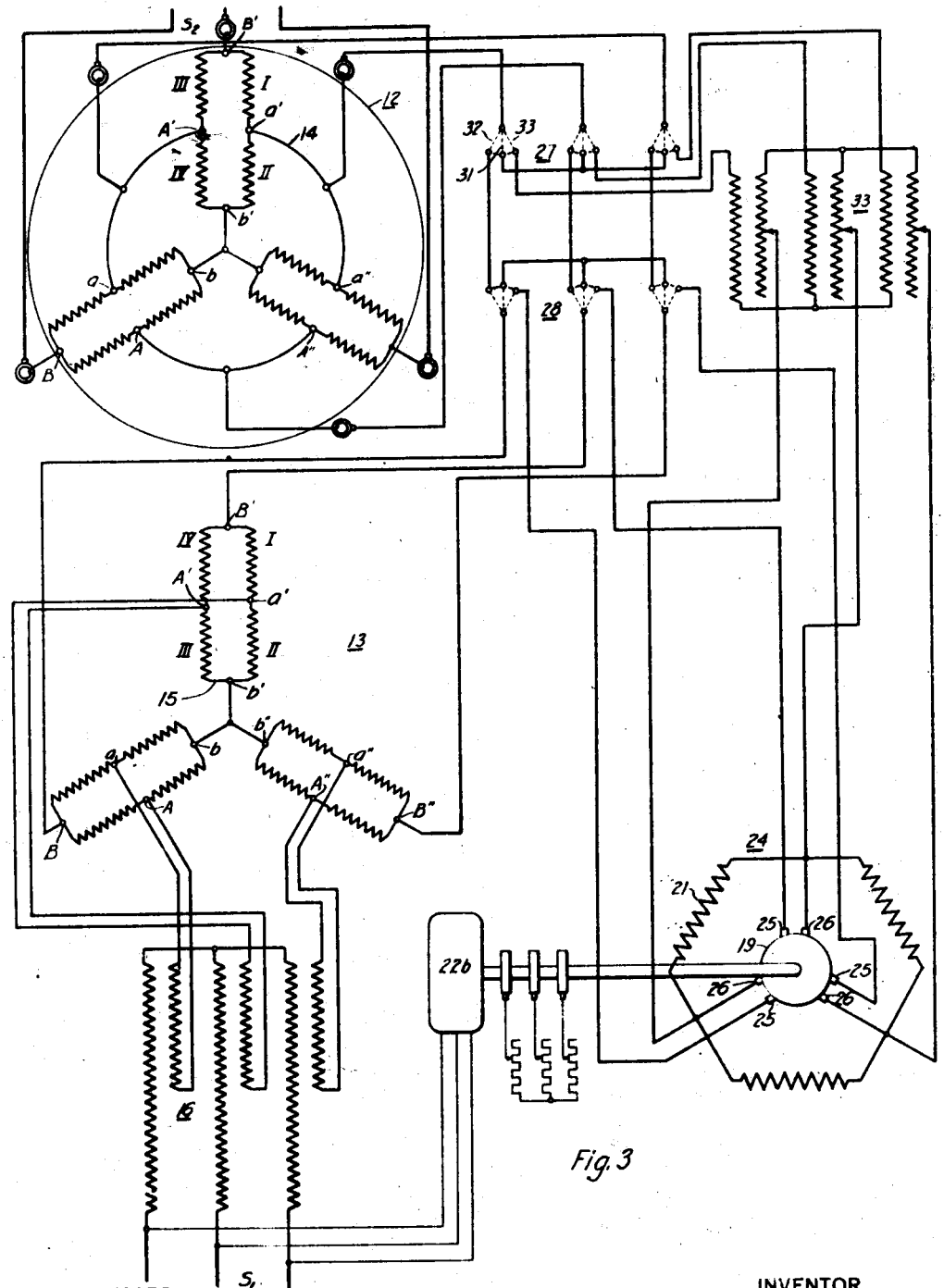
Fig. 3 is a similar view showing a preferred embodiment of my invention, the same being provided with a single exciting machine and other auxiliary equipment.

The frequency changer shown in Fig. 3 is similar to that of Fig. 2 except that, instead of two separate exciters for the secondaries, I employ a single exciter 24 having two independently adjustable sets of brushes 25 and 26 for the adjustment of the phases and the magnitude of the currents in the two secondaries as will be understood by those skilled in the art. In a system operating with a frequency changer of the type just mentioned, it may be not necessary to operate all the time with the exciter connected to the secondaries. To this end, switches 27 and 28 are provided by means of which each of the secondaries may be either, severally close-circuited, as indicated at 31, or interconnected without the exciter, as indicated at 32, or interconnected with the exciter, as indicated at 33.

In order that the exciter voltages effective in the rotor and in the stator may be relatively varied, the connection between the exciter brushes 26 and the rotor secondary terminals is effected through an adjustable transformer 33, while the exciter brushes 25 are connected directly to the stator secondary terminals. With this arrangement, the voltage of the stator secondary terminals is adjusted by regulating the speed of the motor $22^b$ associated with the exciter machine 24, and the voltage of the rotor secondary is adjusted by means of the transformer 33.

As stated before, the type of windings employed in my frequency changers must conform to the condition that the rotating field of one pole-number shall not interfere with the system of windings co-operating with the other pole-number. Some of the windings of this general type are known in the art and include windings which constitute electrically two different windings and also such as are indicated in Fig. 2 and Fig. 3 and which constitute electrically one winding.

Figure 4:
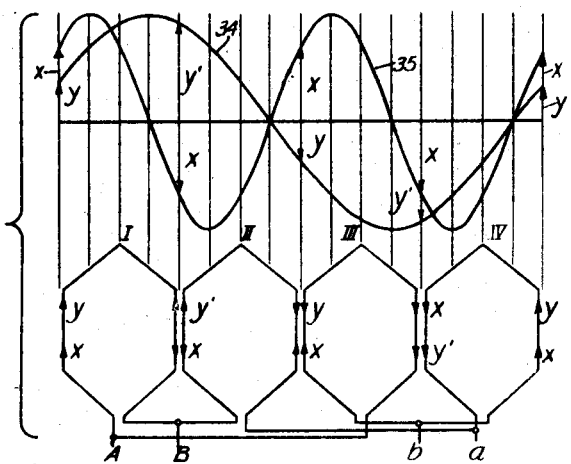
Fig. 4 is a composite diagrammatic view showing a development of one phase of a winding and the corresponding field flux distribution curves, illustrating the principles utilized in the design of the windings used in connection with my invention.

In Fig. 4 is shown a single winding which operates with N and 2N poles and which is thus particularly adapted for operation in connection with my invention. Sine waves 34 and 35 represent the field forms corresponding to N and 2N poles. Only one section corresponding to one pole-pair of the smaller number of poles 34 is illustrated in connection with four groups of coils I, II, III, IV constituting one phase of a winding developed into a plane, while the diagram shows only one turn for each coil, the actual winding will usually consist of a plurality of turns per coil and a number of coils associated in one group.

The coils constituting the winding have a pitch corresponding to 180° of the larger pole number and the four groups I, II, III, IV are spaced at a distance equal to the above pitch. The voltage induced in the individual windings at a certain instant may be taken to be proportional to the ordinates of the corresponding sine waves and are indicated by the arrows $y$, $y'$ for the smaller number of poles and $x$, for the larger number of poles.

By the addition of the voltages induced between the terminals A, $a$ in the two parallel circuits through B and $b$, it will be found that the total induced voltage $2y$ is due entirely to the N-pole field 34 and that the voltages induced by the 2N-pole field 35 cancel out. In a similar manner the winding between the terminals B, $b$ is ineffective for the smaller pole-number and effective with regard to the larger number of poles. Accordingly, the winding shown in Fig. 4 may be effectively used to operate with two numbers of poles and to carry currents of two frequencies without mutual interference.

Figure 5:
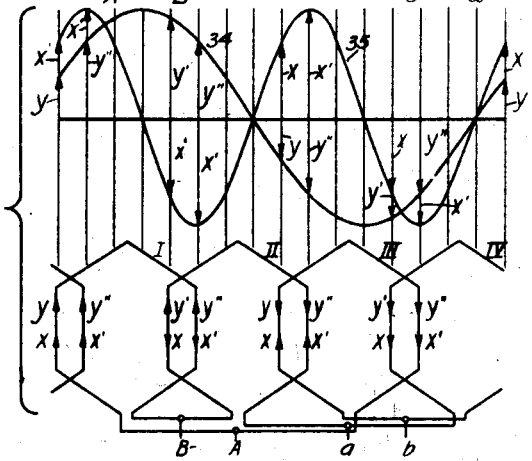
Figs. 5 and 6 are similar views showing, respectively, a single phase and a complete three-phase winding embodying my invention in a preferred form.

In Fig. 5 is shown another winding for N and 2N poles. The winding comprises coils which have a pitch larger than the pole-pitch of the larger number of poles and which are spaced at a distance equal to said pole-pitch.

The larger coil pitch increases the effectiveness of the winding with respect to the smaller number of poles while impairing only slightly the effectiveness with respect to the larger number of poles.

By the addition of the voltages as indicated at $x$, $x'$, $y$, $y'$ and $y''$, between the various points, it will be found that the winding between the terminals A, $a$ is effective only with respect to the smaller number of poles and the winding between the terminals B, $b$ is effective only with respect to the larger number of poles. The winding may accordingly be used with currents of one frequency between the points A, $a$ and with currents of twice said frequency between the points B, $b$.

Figure 6:
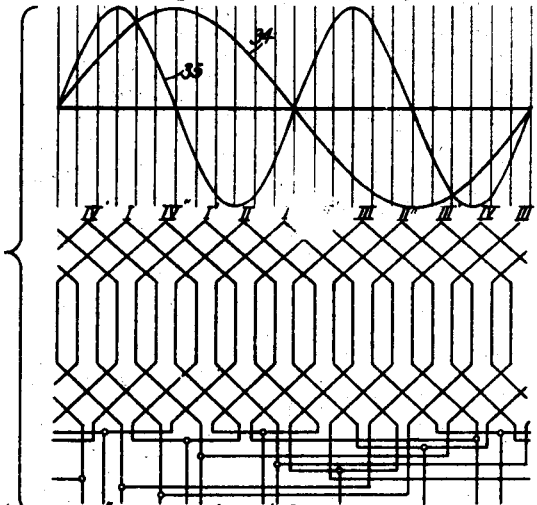

Three windings of the type shown in Figs. 4 or 5 may be combined into a true three-phase winding of the distributed type. A complete three-phase winding, corresponding to the pole-pitch of the phase winding of Fig. 5, is shown in detail in Fig. 6. Coils I to IV comprise a winding which is a duplicate of that shown in Fig. 5, coils I' to IV' constitute a similar winding shifted against the first winding 120° in terms of the larger number of poles, and coils I'' to IV'' comprise a third winding shifted a like amount against the second winding.

Since the three windings are only 60° apart from each other in terms of the smaller number of poles, one of the windings must be connected in reversed direction with regard to the others when making a true three-phase winding for the smaller number of poles. This is indicated in Fig. 3 by the reversal of the designation letters A'', $a''$ on one phase.

Certain broad features of the armature windings shown in this application are claimed in my companion application, Serial No. 634,879, filed Apr. 26, 1923, which has resulted in Patent No. 1,610,522, granted December 14, 1926.

Those skilled in the art will recognize that my invention is susceptible of numerous modifications, and accordingly I do not desire to limit myself to the particular arrangement and design of apparatus herein described. I intend, therefore, in the appended claims, to cover all modifications that are within the spirit and scope of my invention.

I claim as my invention:

1. An alternating-current converter having, in a single machine, a stator core carrying a winding arrangement adapted to be connected to a system of one frequency, a rotor core carrying another winding arrangement adapted to be simultaneously connected to a system of another frequency and other windings operating on said stator and rotor cores carrying a common low-frequency current.

2. In a frequency-converter system, the combination with an alternating-current converter comprising a single stationary magnetizable core, a single rotating magnetizable core, primary winding connections having two pole-numbers and secondary winding connections carrying slip-frequency currents mounted on said cores, of two alternating-current lines of different frequencies respectively, connected to said two primary winding connections of different pole-numbers, and frequency-controlling means adapted to furnish currents of said slip frequency to said secondary winding connections.

3. In a frequency-converting system, the combination with two alternating-current systems of different frequencies, of a dynamo-electric frequency-converter mechanism of the induction-motor type having primary winding means associated with the two alternating-current systems, respectively, relatively rotating secondary winding means of the induction-motor type associated with the respective primary winding means, means for maintaining a predetermined relation between the speeds of relative rotation of the two secondary winding means with relation to their respective primary winding means, and serial electrical connecting means between the two secondary winding means for maintaining a common slip-frequency therein, whereby one of said primary winding means withdraws energy, by induction-motor action, from its associated alternating-current system and the other of said primary winding means supplies energy, by induction-generator action, to its associated alternating-current system.

4. In a frequency-converting system, the combination with two alternating-current systems of different frequencies, of a dynamo-electric frequency-converter mechanism of the induction motor type having primary winding means associated with the two alternating-current systems, respectively, relatively rotating secondary winding means of the induction-motor type associated with the respective primary winding means, means for maintaining a predetermined relation between the speeds of relative rotation of the two secondary winding means with relation to their respective primary winding means, and serial electrical connecting means between the two secondary winding means for maintaining a common slip-frequency therein, whereby one of said primary winding means withdraws energy, by induction-motor action, from its associated alternating-current system and the other of said primary winding means supplies energy, by induction-generator action, to its associated alternating-current system, and a variable-energy translating device serially associated with said secondary electrical connecting means.

5. In a frequency-converting system, the combination with two alternating-current systems of different frequencies, of a dynamo-electric frequency-converter mechanism of the induction-motor type having primary winding means associated with the two alternating-current systems, respectively, relatively rotating secondary winding means of the induction-motor type associated with the respective primary winding means, means for maintaining a predetermined relation between the speeds of relative rotation of the two secondary winding means with relation to their respective primary winding means, and serial electrical connecting means between the two secondary winding means for maintaining a common slip-frequency therein, whereby one of said primary winding means withdraws energy, by induction-motor action, from its associated alternating-current system and the other of said primary winding means supplies energy, by induction-generator action, to its associated alternating-current system, a phase modifying means serially associated with said secondary electrical connecting means.

6. In a frequency-converting system, the combination with two alternating-current systems of different frequencies, of a dynamo-electric frequency-converter mechanism of the induction-motor type having primary winding means associated with the two alternating-current systems, respectively, relatively rotating secondary winding means of the induction-motor type associated with the respective primary winding means, means for maintaining a predetermined relation between the speeds of relative rotation of the two secondary winding means with relation to their respective primary winding means, and serial electrical connecting means between the two secondary winding means for maintaining a common slip-frequency therein, whereby one of said primary winding means withdraws energy, by induction-motor action, from its associated alternating-current system and the other of said primary winding means supplies energy by induction-generator action, to its associated alternating-current system, and means, including a phase-modifying means connected in shunt across said serial electrical connecting means between the two secondary winding means, for interchanging variable wattless and real power with said secondary means.

7. In a frequency-converting system, the combination with two alternating-current systems of different frequencies, of a dynamo-electric frequency-converter mechanism of the induction-motor type having primary winding means associated with the two alternating-current systems, respectively, relatively rotating secondary winding means of the induction-motor type associated with the respective primary winding means, means for maintaining a predetermined relation between the speeds of relative rotation of the two secondary winding means with relation to their respective primary winding means, and serial electrical connecting means between the two secondary winding means for maintaining a common slip-frequency therein, whereby one of said primary winding means withdraws energy, by induction-motor action, from its associated alternating-current system and the other of said primary winding means supplies energy, by induction-generation action, to its associated alternating-current system, and a variable-energy translating device connected in shunt across said serial electrical connecting means between the two secondary winding means.

8. In a frequency-converting system, the combination with two alternating-current systems of different frequencies, of a dynamo-electric frequency-converter mechanism of the induction motor type having primary winding means associated with the two alternating-current systems, respectively, relatively rotating secondary winding means of the induction-motor type associated with the respective primary winding means, means for maintaining a predetermined relation between the speeds of relative rotation of the two secondary winding means with relation to their respective primary winding means, and serial electrical connecting means between the two secondary winding means for maintaining a common slip frequency therein, whereby one of said primary winding means withdraws energy, by inductioning means withdraws energy, by induction-motor action, from its associated alternating-motor action, from its associated alternating-current system and the other of said primary winding means supplies energy, by induction-generator action, to its associated alternating-current system, a phase-modifying means connected in shunt across said serial electrical connecting means between the two secondary winding means.

9. A dynamo-electric frequency-converter mechanism of the induction-motor type having two sets of terminals adapted to be simultaneously connected to alternating-current systems of different frequencies, means including primary windings for producing rotating fields of different pole-numbers in the respective primary windings associated with the two sets of terminals, relatively rotating secondary winding means of the induction-motor type associated with the respective primary winding means, means for maintaining a predetermined relation between the speeds of relative rotation of the two secondary winding means with relation to their respective primary winding means and serial electrical converting means between the two secondary winding means for maintaining a common slip-frequency therein.

10. A dynamo-electric frequency-converter mechanism of the induction-motor type having two sets of terminals adapted to be simultaneously connected to alternating-current systems of different-frequencies, means including primary windings for producing rotating fields of different pole-numbers in the respective primary windings associated with the two sets of terminals, relatively rotating secondary winding means of the induction-motor type associated with the respective primary winding means, means for maintaining a predetermined relation between the speeds of relative rotation of the two secondary winding means with relation to their respective primary winding means, serial electrical connecting means between the two secondary winding means for maintaining a common slip-frequency therein, a slip-frequency dynamo-electric machine in series circuit relation to said serial electrical connecting means and means for causing said slip-frequency machine to interchange power with said two secondary winding means.

11. A dynamo-electric frequency-converter mechanism of the induction-motor type having two sets of terminals adapted to be simultaneously connected to alternating-current systems of different-frequencies, means including primary windings for producing rotating fields of different pole-numbers in the respective primary windings associated with the two sets of terminals, relatively rotating secondary winding means of the induction-motor type associated with the respective primary winding means, means for maintaining a predetermined relation between the speeds of relative rotation of the two secondary winding means with relation to their respective primary winding means, serial electrical connecting means between the two secondary winding means for maintaining a common slip-frequency therein, a slip-frequency dynamo-electric machine in series circuit relation to said serial electrical connecting means, and means for causing said slip-frequency machine to interchange real and reactive power with said two secondary winding means.

12. A dynamo-electric frequency-converter mechanism of the induction-motor type having the two sets of terminals adapted to be simultaneously connected to alternating-current system of different-frequencies, means including primary windings for producing rotating fields of different pole-numbers in the respective primary windings associated with the two sets of terminals, relatively rotating scondary winding means of the induction-motor type associated with the respective primary winding means, means for varying the speeds of relative rotation of the two secondary winding means with relation to their respective primary winding means, and means for independently controlling the amount of power transferred between the two systems at different speeds.

13. A dynamo-electric frequency-converter mechanism of the induction-motor type having two sets of terminals adapted to be simultaneously connected to alternating-current systems of different-frequencies, means including primary windings for producing rotating fields of different pole-numbers in the respective primary windings associated with the two sets of terminals, relatively rotating secondary winding means of the induction motor-type associated with the respective primary winding means, means for maintaining a predetermined relation between the speeds of relative rotation of the two secondary winding means with relation to their respective primary winding means, serial electrical connecting means between the two secondary winding means for maintaining a common slip-frequency therein, and a slip-frequency dynamo-electric machine connected in shunt relation across the serial connecting means between the two secondary winding means.

14. A dynamo-electric frequency-converter mechanism of the induction-motor type having two sets of terminals adapted to be simultaneously connected to alternating-current systems of different frequencies, means including primary windings for producing rotating fields of different pole-numbers in the respective primary windings associated with the two sets of terminals, relatively rotating secondary winding means of the induction-motor type associated with the respective primary winding means, means for maintaining a predetermined relation between the speeds of relative rotation of the two secondary winding means with relation to their respective primary winding means, serial electrical connecting means between the two secondary winding means for maintaining a common slip-frequency therein, a slip-frequency dynamo-electric machine connected in shunt relation across the serial connecting means between the two secondary winding means, and means for causing said slip-frequency machine to interchange real and reactive power with said serial connecting means.

15. An alternating current converter comprising a stationary magnetic core, a movable magnetic core, winding connections upon each core adapted to give two different pole-numbers, alternating-current terminals of one frequency connected to the winding connections of one pole-number upon said stationary core, other alternating-current terminals of another frequency connected to the winding connections of the other pole-number upon said movable core, and means for electrically interconnecting the slip-frequency currents of the remaining winding connections on both cores.

16. An alternating current converter comprising a stationary magnetic core, a movable magnetic core, winding connections upon each core adapted to give two different pole-numbers, alternating-current terminals of one frequency connected to the winding connections of one pole-number upon said stationary core, other alternating-current terminals of another frequency connected to the winding connections of the other pole-number upon said movable core, and exciting means adapted to supply current of common slip frequency to the remaining winding connections of both cores.

17. An alternating current converter comprising a stationary magnetic core, a movable magnetic core, winding connections upon each core adapted to give two different pole-numbers, alternating-current terminals of one frequency connected to the winding connections of one pole-number upon said stationary core, other alternating-current terminals of another frequency connected to the winding connections of the other pole-number upon said movable core, exciting means adapted to supply current of common slip frequency to the remaining winding connections of both cores, and means for adjusting the relative phases and magnitudes of the slip-frequency currents and voltages in said remaining winding connections.

18. An alternating current converter comprising a stationary magnetic core, a movable magnetic core, winding connections upon each core adapted to give two different pole-numbers, alternating-current terminals of one frequency connected to the winding connections of one pole-number upon said stationary core, other alternating-current terminals of another frequency connected to the winding connections of the other pole-number upon said movable core, and means for adjusting the relative phases and magnitudes of the slip-frequency currents and voltages in the remaining winding connections on both cores.

19. An alternating-current converter of the induction type comprising the combination of two relatively movable members, windings upon each member adapted to produce the effect of two different pole-numbers, two alternating-current systems connected to the primary windings corresponding to each of said pole numbers and means for either closed-circuiting each of the remaining secondary windings, closed-circuiting one of said secondary windings and connecting the other secondary winding to an auxiliary dynamo-electric machine, interconnecting said secondary windings, or interconnecting said secondary windings to each other and to an auxiliary means capable of supplying slip-frequency currents.

20. In a frequency-changer system, the combination with two polyphase systems of different frequencies, of a machine having a stationary core, a rotating core, windings upon said cores giving the effect of two different pole numbers, means for mesh-connecting terminals of the windings corresponding to the primary pole systems to said two polyphase systems, respectively, and means for star-connecting terminals of the windings, corresponding to the secondary system of one pole-number to the terminals of the windings corresponding to the secondary system of the other pole-number.

21. In a frequency changer for supplying electrical energy from a system of one frequency to a system of another frequency, the combination of a stationary core, a rotating core, windings upon said cores giving two different sets of poles, one set of poles operating as a motor and having its primary windings arranged upon one of said cores and connected to the supplying system, the other set of poles operating as a generator and having its primary windings arranged upon the other of said cores and connected to the supplied system, means for interconnecting the secondary windings of the two sets of poles carrying a current of a common slip-frequency, said slip being positive with respect to the primary of said motor and negative with respect to the primary of said generator.

22. A single-unit frequency changer having a single stator core, a single rotor core, a single combined winding on each core to produce two sets of poles, means for connecting the stator terminals corresponding to one set of poles to an alternating-current supply line of one frequency, means for connecting the rotor terminals corresponding to the other set of poles to an alternating-current load line of another frequency, and means for interconnecting the terminals corresponding to the secondary windings of said two sets of poles.

23. In a dynamo-electric machine, the combination of a stator, a rotor, uniformly distributed windings upon said rotor and said stator, end terminals upon said windings adapted to produce one set of poles, intermediate terminals upon said windings for producing another set of poles, and means for interconnecting the end terminals of said rotor winding to the intermediate terminals of said stator winding.

24. A single frequency changer having a single stator core, a single rotor core, a combined winding on each core adapted to produce two sets of poles, connecting means for connecting the stator terminals corresponding to one set of poles to an alternating current supply line of one frequency, connecting means for connecting the rotor terminals corresponding to the other set of poles to an alternating-current load line of another frequency and an auxiliary dynamo-electric machine connected to the terminals corresponding to the secondary windings of said two sets of poles and adapted to furnish slip-frequency current thereto.

25. In a frequency changer, the combination of a stator member, a rotor member, a single winding on each of said numbers adapted to produce two sets of poles, connecting means for connecting the stator terminals corresponding to one set of poles to an alternating-current supply line of one frequency, connecting means for connecting the rotor terminals corresponding to the other set of poles to an alternating-current load line of another frequency, an auxiliary exciting machine interconnected to the terminals corresponding to the secondary windings of said two sets of poles and adapted to supply a current of a common slip frequency thereto, and means for varying the phase and the magnitude of the slip-frequency currents in said secondary-winding terminals.

26. In a frequency changing system, the combination with two three-phase systems of different frequencies, of a frequency-converter machine of the induction-motor type, said machine having a stationary core, a movable core, each of said cores being provided with a single distributed polyphase winding adapted to operate simultaneously in conjunction with two different pole-numbers N and 2N, each phase of said windings consisting of coils which are spaced apart by a distance substantially equal to the pole-pitch of the larger number of poles and which have a coil-pitch substantially equal to, or greater than, said pole-pitch, said winding having small-pole-number terminals and intermediate large-pole-number terminals, means for electrically connecting the small-pole-number terminals of one winding to the large-pole-number terminals of the other winding, means for connecting the remaining large-pole-number terminals to the three-phase system having the higher frequency, and means for connecting the remaining small-pole-number terminals to the three-phase system having the lower frequency.

27. A frequency changer comprising a primary member and a secondary member each provided with a single distributed polyphase winding adapted to operate simultaneously in conjunction with two different pole-numbers N and 2N, each phase of said windings consisting of coils which are spaced apart by a distance substantially equal to the pole-pitch of the larger number of poles and which have a coil-pitch substantially equal to, or greater than said pole-pitch.

28. A voltage tie for two independent alternating current systems of different frequencies comprising dynamo-electric mechanism constituting, in effect, two induction machines of the form wound secondary type adapted to have their primary windings respectively connected to the different frequency systems and having their rotating members mounted on a common shaft, electrical connections between the secondary windings of said machines, the relation between the pole number of said machines being such that their secondary frequencies are equal at only one speed.

In testimony whereof, I have hereunto subscribed my name this 20th day of April, 1923.

RUDOLF E. HELLMUND.